H. G. GINACA.
MACHINE FOR TREATING FRUIT.
APPLICATION FILED APR. 30, 1912.
1,060,247.
Patented Apr. 29, 1913.
3 SHEETS—SHEET 1.
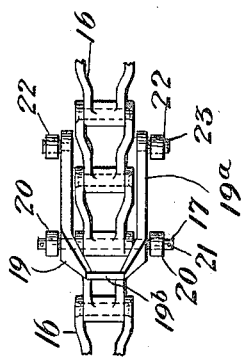
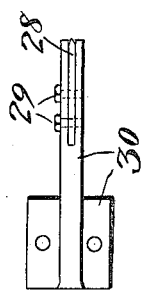
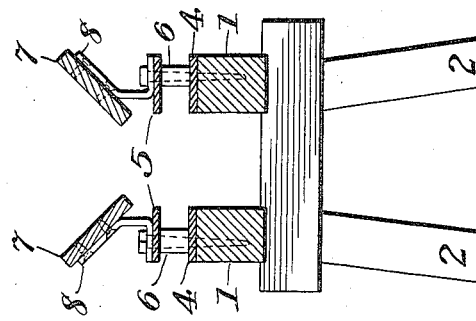
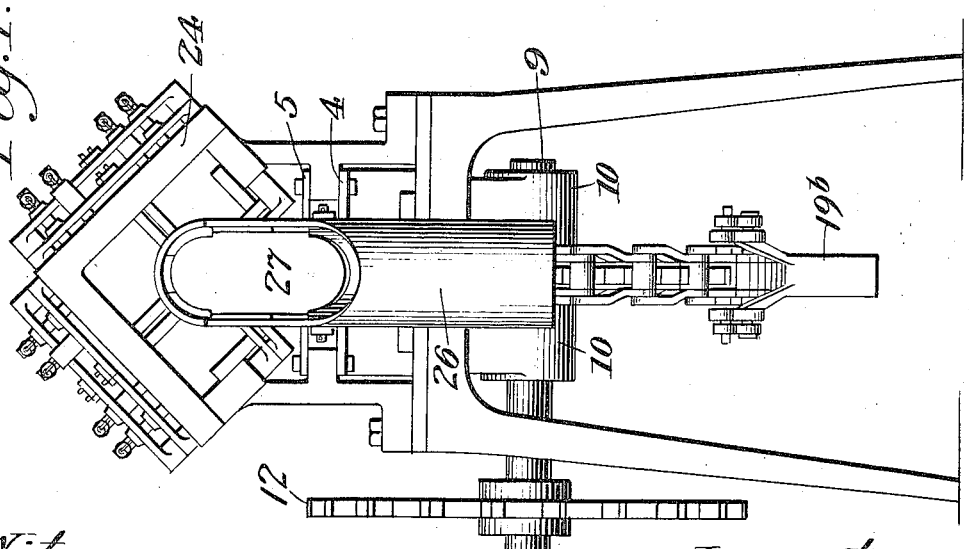
Witnesses.
Inventor.

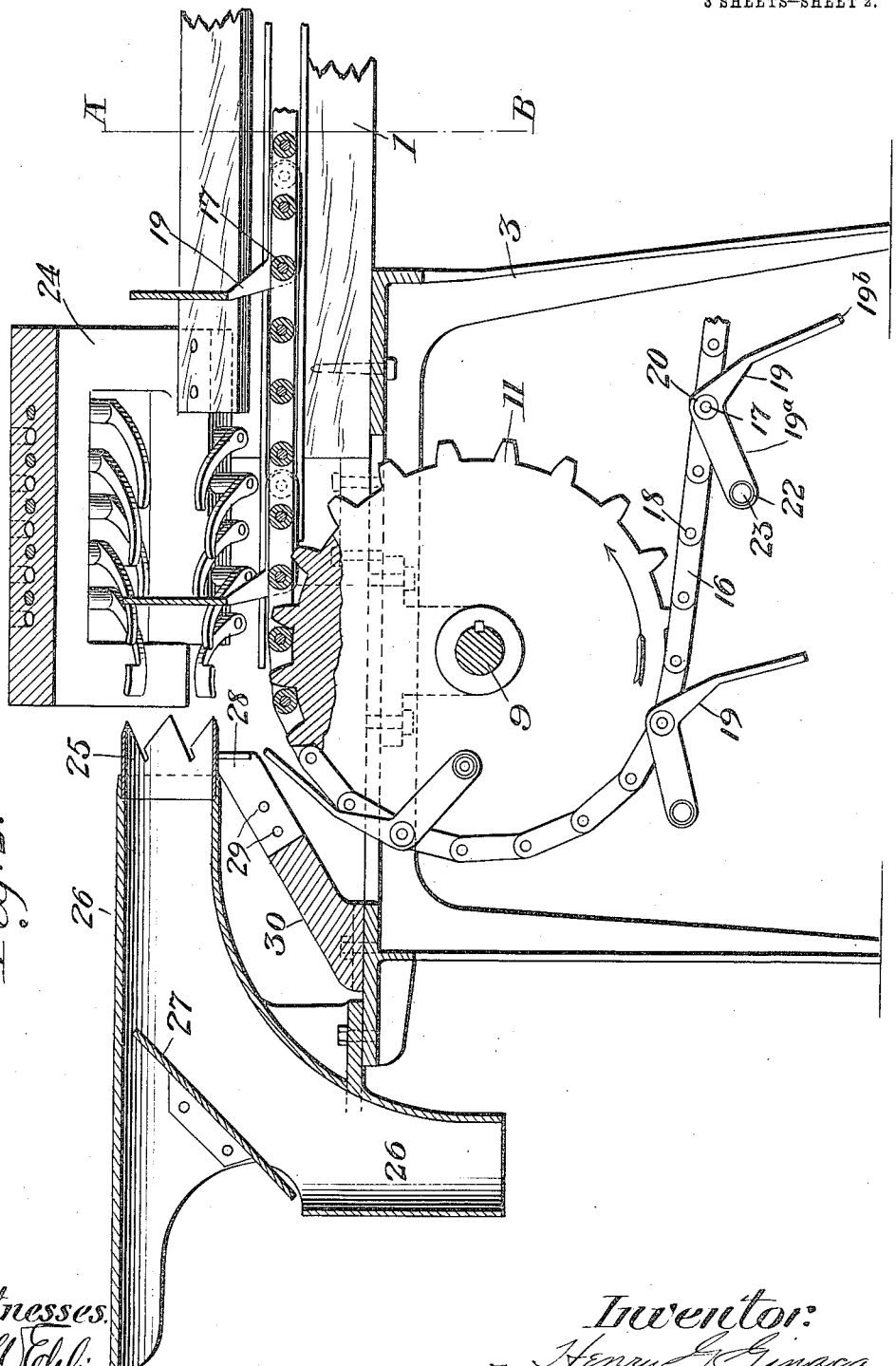

H. G. GINACA.
MACHINE FOR TREATING FRUIT.
APPLICATION FILED APR. 30, 1912.
1,060,247.
Patented Apr. 29, 1913.
3 SHEETS—SHEET 3.
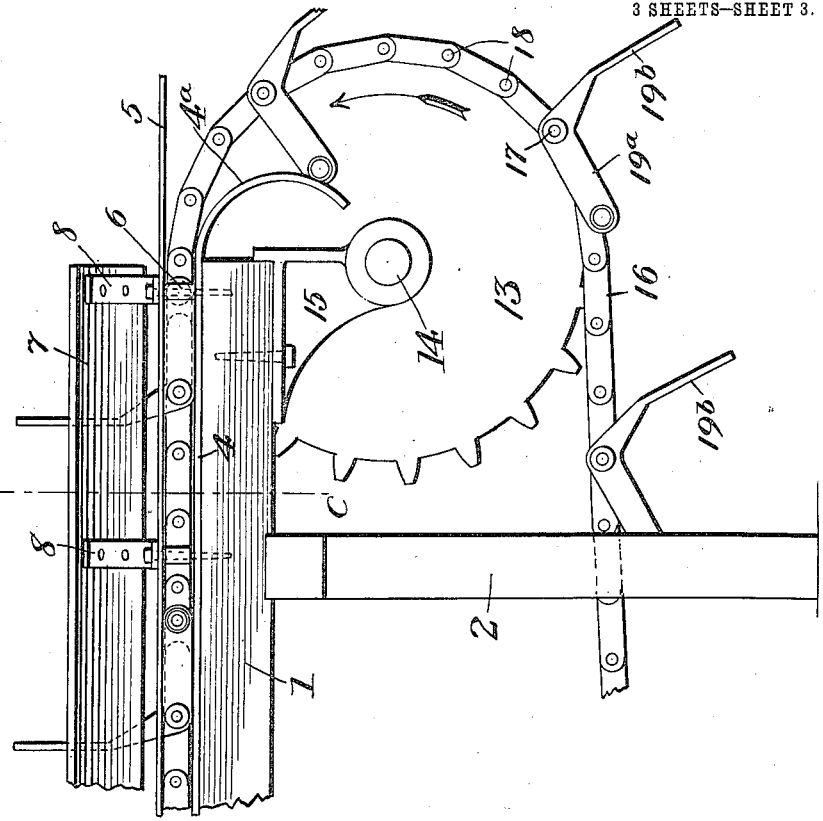
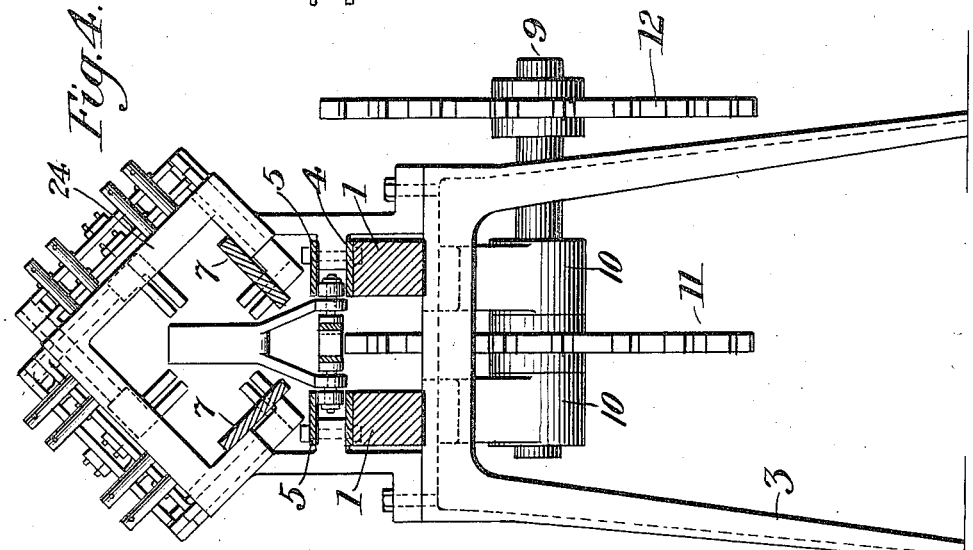
Witnesses.
Inventor.

UNITED STATES PATENT OFFICE.

HENRY GABRIEL GINACA, OF HONOLULU, TERRITORY OF HAWAII, ASSIGNOR TO HAWAIIAN PINEAPPLE COMPANY, LTD., OF HONOLULU, TERRITORY OF HAWAII, A CORPORATION OF THE TERRITORY OF HAWAII.

MACHINE FOR TREATING FRUIT.

1,060,247.  Specification of Letters Patent.  Patented Apr. 29, 1913.

Application filed April 30, 1912. Serial No. 694,081.

*To all whom it may concern:*

Be it known that I, HENRY GABRIEL GINACA, a citizen of the United States, residing at Honolulu, county of Honolulu, Territory of Hawaii, have invented certain new and useful Improvements in Machines for Treating Fruit; and I do hereby declare the following to be a full, clear, and exact description of the invention, such as will enable others skilled in the art to which it appertains to make and use the same.

This invention relates to machines for treating fruit, and particularly for centering and sizing fruit, such as pineapples. Its object is to provide a machine for centering and sizing the fruit in a rapid, automatic and continuous manner.

The invention contemplates a trough or the like on which the pineapples or other fruit are placed, means for moving the fruit thus placed in a rapid manner through a centering device and then forcing the fruit through a sizing tube and at the same time remove the rind and outer portion of each fruit in a single piece, these operations being accomplished in a continuous and automatic manner. It also contemplates a sizing knife preferably of the type as described in U. S. Letters Patent No. 1,006,621, issued Oct. 24, 1911 to L. E. Arnold, although the invention may be used in connection with any other suitable means for sizing centered fruit. As the centering attachment contemplated forms the subject matter of a separate application for patent, filed by me of even date herewith, it will be but briefly referred to hereinafter. Any other suitable centering device may be employed.

The invention consists in the novel arrangement and combination of parts as hereinafter described and claimed.

In the accompanying drawings, forming a part of this specification, similar characters of reference indicate corresponding parts in the several views.

Figure 1 represents a rear end elevation of a machine for treating fruit embodying my invention. Fig. 2 is a longitudinal sectional elevation of the rear portion of the same machine. Fig. 3 is a side elevation of the front portion of the machine. Fig. 4 is a sectional view on the line A—B of Fig. 2. Fig. 5 is a section on the line C—D of Fig. 3. Fig. 6 is a detail showing in plan one of the attachments for propelling fruit and its connection to the chain. Fig. 7 is a detail showing in plan the parting knife holder and guard.

Referring to the drawings, the bed of the machine consists of two longitudinal beams 1 supported by suitable stands 2 and their rear ends by the front end of the table 3. Guide bars 4 and 5, with distance pieces 6 between same, are secured to the top of each of the beams 1. The front ends $4^a$ of the guide bars 4 are curved downward and rearward as shown in Fig. 3. A board 7 or the like is supported above each guide bar 5 by the brackets 8. Each board 7 is inclined upward and outward to form a trough of ample length to receive a plurality of fruit to be treated. The longitudinal centers of fruit placed upon the trough practically coincide with the longitudinal axis of the machine. An opening is provided between the lower edges of the boards 7 to permit of the passage of means for propelling fruit longitudinally upon the trough.

The shaft 9 journaled in the boxes 10 bolted to the table 3 is provided with a sprocket wheel 11 between the boxes 10 and is driven by the sprocket wheel 12. A similar sprocket wheel 13 is secured to the shaft 14 adapted to turn in the bracket boxes 15 fastened below the front ends of each of the beams 1. A suitable endless chain 16 connects the sprocket wheels 11 and 13. The chain 16 is provided at intervals with long pins 17 in lieu of the usual rivet 18. A propelling attachment 19 is pivoted on each pin 17 to straddle the chain 16. Rollers 20 are adapted to turn on the pin 17 between the attachment 19 and the cotter pin 21 in each end of the pin 17. The attachment 19 is forked shaped with its two prongs $19^a$ bent approximately at right angles to its shank $19^b$. A roller 22 is mounted to turn on a stud 23 on the outside of the end of each prong $19^a$. The rollers 20 and 22 are adapted to travel between the guide bars 4 and 5.

A centering attachment 24 is secured above the table 3, and the rear ends of the boards 7 are attached to the front end of the frame of this attachment, Figs. 2 and 4. The axis of the attachment 24 coincides with the axis of the machine, so that fruit placed upon the trough is approximately centered before it enters the attachment.

A sizing knife 25 is provided at the front end of the casting 26 supported upon the rear of the table 3, with its axis in line with the axis of the centering attachment, Figs. 1 and 2. The casting 26 is T shaped and is provided with a deflecting plate 27. A parting knife 28 is removably secured by the bolts 29 to the holder and guard casting 30, fastened upon the table 3 in front of and under the casting 26, Fig. 2.

In operation, the shaft 9 is revolved, in the direction shown by the arrow in Fig. 2, by means of a chain applied to the sprocket wheel 12, causing the portion of the chain 16 under the opening between the boards 7 of the trough to travel rearward. The rollers 22 engage the curved ends 4ª of the guide bars 4 and cause the propelling attachment 19 to swing on the pin 17 as the chain 16 moves rearward until the shank 19ᵇ is vertical and the prongs 19ª are horizontal, in which position the rollers 20 and 22 are between the guide bars 4 and 5. Fruit is placed upon the boards 7 forming the trough in the intervals between the vertical shanks 19ᵇ of the propelling attachments 19, and are thereby pushed rearward upon said trough, and nearly through the centering attachment, the shank 19ᵇ passing through the space between the tips of the fingers of the centering attachment, until the end of the fruit has engaged the sizing knife 25, whereupon the rollers 22 leave the rear end of the guide bars 4, and the propelling attachment 19 being no longer supported in a vertical position thereby swings on the pin 17, the prongs 19ª in lowering straddle the sprocket wheel 11 and the shank 19ᵇ swings forward. The chain 16 continuing rearward and downward over the sprocket wheel 11, the shank 19ᵇ is prevented from striking the parting knife 28 or the sizing knife 25 by the guard 30. The intervals between the propelling attachments 19 are made sufficient to permit each of these attachments to swing as described in leaving the fruit without its shank 19ᵇ engaging the next succeeding fruit. The fruit which has been centered in the centering attachment and entered in the sizing knife is now pushed rearward by the succeeding fruit, the sized fruit passing through the casting 26 and deflected by the plate 27 is discharged from the bottom of said casting in a direction at right angles to the axis of the machine. In the meantime the rind and outer portion of the fruit has been parted by the knife 28 and has been pushed rearward by similar outer portions of succeeding fruit and is discharged in one piece from the rear of the top of the casting 26. It will now be noted that the fruit is centered and sized and the rind or outer portion removed by the machine in a rapid and continuous and automatic manner.

I claim:

1. A machine for treating fruit comprising, a bed suitably supported, a sprocket wheel under each end of the bed, an endless chain over these sprocket wheels, guide bars above the bed, a trough over the guide bars, propelling attachments pivoted at intervals to the chain, and a sizing knife at the rear of the trough.

2. A machine for treating fruit comprising, a bed suitably supported, a sprocket wheel under each end of the bed, an endless chain over these sprockets, guide bars above the bed, a trough over the guide bars, propelling attachments pivoted at intervals to the chain, a sizing knife, and a centering device between the trough and the sizing knife.

3. A machine for treating fruit comprising, a bed suitably supported, two sprocket wheels, an endless chain over these wheels, propelling attachments pivoted to the chain, guide bars, a trough, a sizing knife, and a knife for parting the rind.

4. A machine for treating fruit comprising, a bed, two sprocket wheels, an endless chain with propelling attachments pivoted to same at intervals, a sizing knife, a trough, guide bars, a centering device, and a knife for parting the rind.

5. In a machine for treating fruit, a sizing knife, and means operating in one direction only to force the fruit into the sizing knife, said means comprising hinged pushing elements adapted to abut the rear of the fruit.

6. In a machine for treating fruit, a centering device, a sizing tube, and means operating in one direction only for forcing fruit through the centering device and into the sizing tube, said means comprising hinged pushing elements adapted to abut the rear of the fruit only.

7. In a machine for treating fruit, means operating in one direction only for propelling fruit and for forcing same through a centering device and into a sizing knife, and a knife for parting the rind.

8. In a machine for treating fruit, a sizing knife, a centering device, a trough, an opening in the bottom of the trough, guide bars under the trough, an endless chain, and a plurality of attachments hinged at intervals to the chain and operating through said opening and guided by said guide bars for propelling fruit longitudinally upon the trough, and through said centering device and into the sizing knife.

9. In a machine for treating fruit, a sizing knife, a centering device, a trough, an opening in the trough, an endless chain operating below the opening, a plurality of attachments hinged at intervals to said chain, and means for causing the attachments to project upward through said opening for the purpose of propelling fruit through said centering device and into the sizing knife.

10. In a machine for treating fruit, a trough, an opening in the trough, a chain operating below the opening, a plurality of attachments pivoted at intervals to said chain, a sizing knife, means for causing the attachments operating through said opening to propel fruit on the trough and to enter the fruit in the sizing knife.

11. In a machine for treating fruit, a trough, an opening in the trough, a chain operating below the opening, a plurality of attachments pivoted at intervals to said chain, a sizing knife, means for causing said attachments to propel fruit on the trough and enter same in the sizing knife, and then cease propelling the fruit while the chain is in motion.

12. In a machine for treating fruit, a sizing tube, and a sizing knife carried thereby, a portion of said tube being deflected downwardly to deliver the fruit at right angles to the axis of the sizing tube.

13. In a machine for treating fruit, a sizing knife, means for forcing fruit through said knife, means for guiding the sized fruit and discharging same at right angles to the sizing knife, means for parting the rind, and means for guiding the rind and outer portion of the fruit.

14. In a machine for treating fruit, a centering device comprising a frame provided with a gap therein, fruit engaging fingers pointing in the same direction within the frame, and means projecting laterally into said gap for propelling fruit through said attachment.

15. In a machine for treating fruit, a sizing knife, a centering device comprising a frame provided with a gap, fruit engaging fingers pointing in the same direction within the frame, and means projecting laterally into said gap for propelling fruit through said attachment and into the sizing knife.

In testimony whereof I affix my signature, in presence of two witnesses.

HENRY GABRIEL GINACA.

Witnesses:
ROBT. J. PRATT,
ARTHUR F. EWART.